United States Patent
Gurtler et al.

[11] 3,881,808
[45] May 6, 1975

[54] LIQUID CRYSTAL LIGHT CONTROL DEVICE HAVING A HIGH TRANSMISSION EFFICIENCY

[75] Inventors: Richard W. Gurtler, Mesa; Reuben Wechsler, Phoenix, both of Ariz.

[73] Assignee: Motorola, Inc., Chicago, Ill.

[22] Filed: Dec. 7, 1973

[21] Appl. No.: 422,953

[52] U.S. Cl............................ 350/160 LC; 350/150
[51] Int. Cl............................................. G02f 1/28
[58] Field of Search...................... 350/150, 160 LC

[56] References Cited
UNITED STATES PATENTS

| | | | |
|---|---|---|---|
| 3,661,442 | 5/1972 | Kumada et al..................... | 350/150 |
| 3,661,444 | 5/1972 | Matthries........................... | 350/150 |
| 3,731,986 | 5/1973 | Fergason............................ | 350/150 |

*Primary Examiner*—Stanley T. Krawczewicz
*Assistant Examiner*—Rolf Hille
*Attorney, Agent, or Firm*—Vincent J. Rauner; Willis E. Higgins; Maurice J. Jones, Jr.

[57] ABSTRACT

A high image transmission efficiency for a precisely controllable time duration is provided by two twisted nematic, liquid crystal cells sandwiched between two polarizers. The polarizers are cross polarized. If neither liquid crystal cell is activated, the plane of polarization of light passed by the first polarizer is rotated by the first and second cells so that the light is absorbed by the second polarizer. If only the first cell is activated, the light and image are passed through the device. If both cells are activated, the light passed by the first polarizer is absorbed by the second polarizer. Circuitry for operating the liquid crystal device and a camera including a mechanical shutter which operates in cooperation with the device are also disclosed.

14 Claims, 9 Drawing Figures

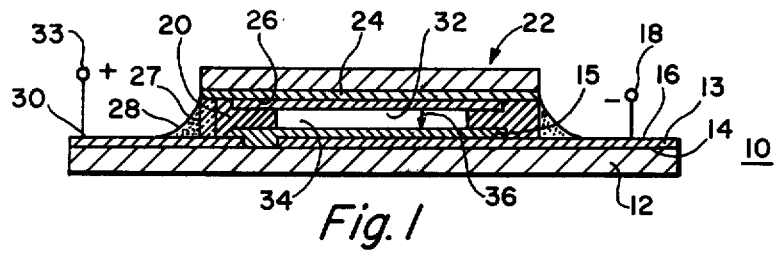
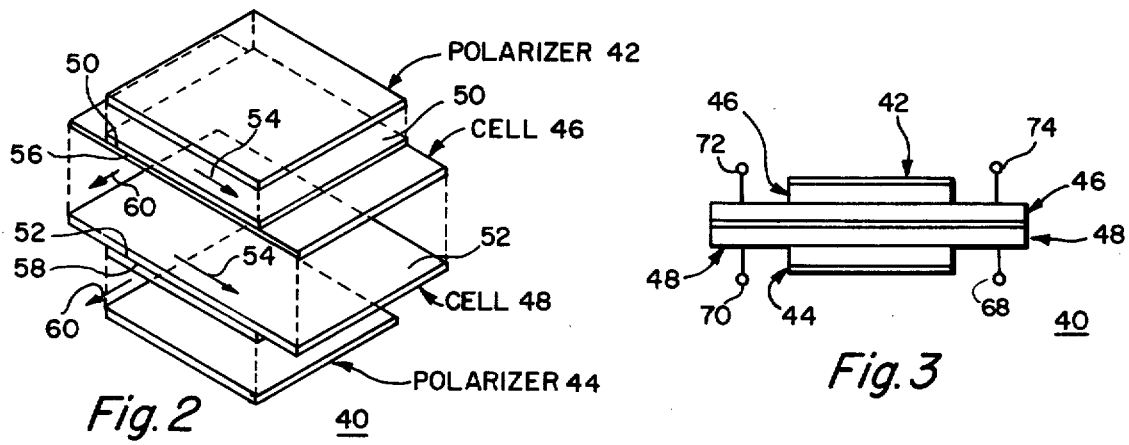
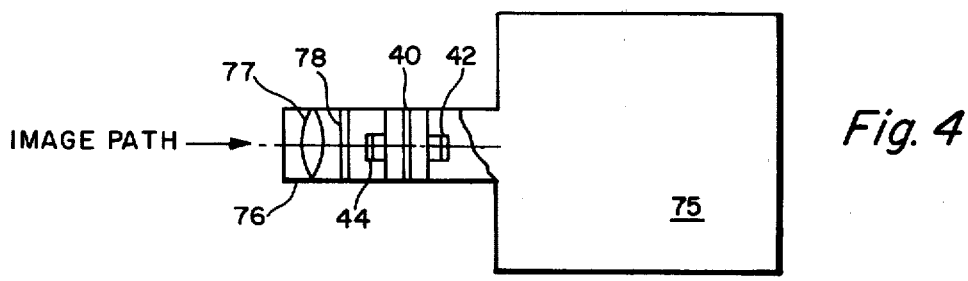
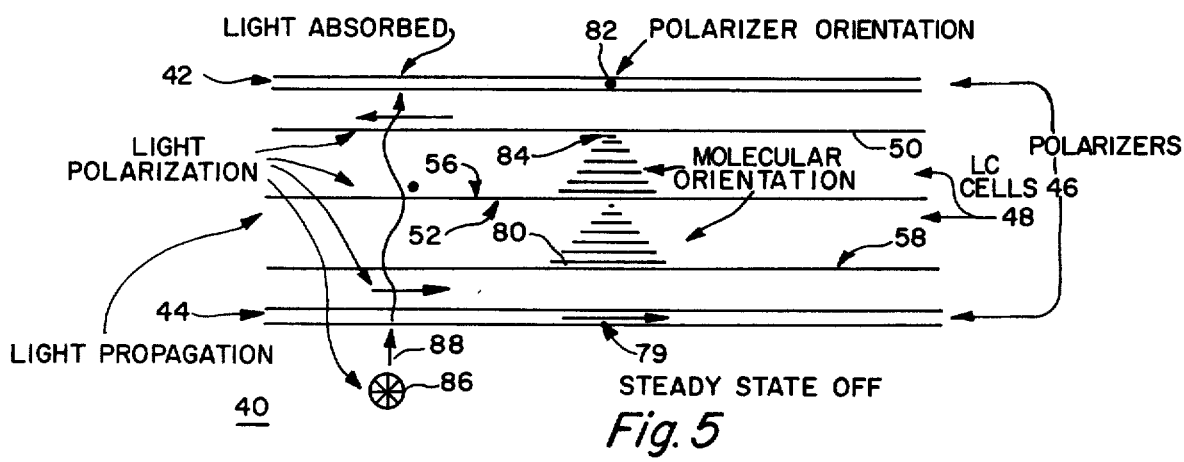

LIQUID CRYSTAL LIGHT CONTROL DEVICE HAVING A HIGH TRANSMISSION EFFICIENCY

CROSS REFERENCE TO RELATED APPLICATIONS

The subject matter of the present application is related to the subject matter of an application entitled "Method for Fabricating A Liquid Crystal Display Device," which was filed on May 23, 1972 for Richard W. Gurtler and bears Ser. No. 256,028 and to an application entitled "Liquid Crystal Light Control Device and Circuit," which was filed on Oct. 23, 1973 for Richard W. Gurtler and bears Ser. No. 408,779.

BACKGROUND OF THE INVENTION

There are many present day applications wherein it is desired to precisely control the passage of light through an aperture. For instance, many cameras include elaborate mechanical shutter control mechanisms which enable the photographer to mechanically set the amount of time or which automatically set the amount of time during which light is transmitted through the lens to thereby control the exposure of photographic film within the camera. Some of these mechanical control devices, and particularly the automatically setting types, are not capable of accurate shutter control. Furthermore, the fabrication, assembly and repair of variable mechanical shutters is tedious and requires skilled workmen. Because of the expense and other problems associated with mechanical shutters having mechanical control mechanisms, it is desirable to provide an electronically activated and controlled light valve or shutter which can be used in cooperation with a simple inexpensive mechanical shutter to facilitate accurate control of the time duration that the composite shutter remains transmissive.

In the past, electronic light control devices have included thin layers of liquid crystal material in combination with polarizers. One prior art device includes a cell having twisted nematic liquid crystal material sandwiched between two polarizers which are both polarized in the same direction. In the "opaque" mode of operation, light passing through the first polarizer is rotated 90° by the liquid crystalline material and absorbed by the second polarizer. In the "transmissive" mode, the domains of the liquid crystal material are aligned in response to an electric field applied thereacross so that the plane of polarization of the light passed by the first polarizer is not rotated as the light passes through the liquid crystal material. Consequently, the second polarizer transmits light and image while the field is applied. After the field is removed, the twisted nematic liquid crystal molecules return to their "twisted" state and the light is again absorbed by the second polarizer. The "decay time" which is defined as the time it takes for the domains to return to their non-field-dependent state after the magnitude of the applied field is reduced below the threshold is too uncontrollable and long in duration for the foregoing prior art structure to be satisfactorily utilized in a camera because camera shutters require precise termination of the transmissive mode of operation.

The aforementioned related application entitled "Liquid Crystal Light Control Device and Circuit" discloses a liquid crystal shutter comprised of two twisted nematic, liquid crystal cells sandwiched between three polarizers. This structure enables precise control of the initiation and termination of the transmissive mode of operation. The termination of the transmissive mode of operation is not dependent upon the non-field-dependent decay time of liquid crystalline material. However, since the light and image must pass through the three polarizers while the device is in its transmissive mode of operation, the light and image transmissive efficiency of the light control device of the aforementioned application is slightly less than desirable for some applications.

SUMMARY OF THE INVENTION

One object of the invention is to provide an improved light control device including liquid crystalline material.

Another object of the invention is to provide a light control device which transmits light for a predetermined period of time and which has a relatively high image transmission efficiency as compared to other light control devices.

Still another object of this invention is to provide a liquid crystal, light control device which transmits light for an adjustable, predetermined duration of time, which duration is precisely controllable by electronic circuitry.

A further object of this invention is to provide an electronically controlled shutter which is suitable for use in cameras.

A still further object of this invention is to provide an electronically controlled liquid crystal shutter which operates in cooperation within an inexpensive mechanical shutter to provide a composite shutter having a precisely controlled variable light transmissive duration and which is relatively inexpensive as compared to prior art mechanical shutters and mechanical control mechanisms which cooperate to provide the same precisely controlled, variable light transmissive duration.

The light control device of the invention includes first and second adjacent twisted nematic liquid crystal cells which are sandwiched between first and second polarizers. The first polarizer, which is polarized in a first direction, is juxtapositioned against a first surface of the first liquid crystal cell. The liquid crystal material adjacent to the first polarizer is also aligned in the first direction. The unactivated liquid crystal material adjacent the second surface of the first liquid crystal cell is aligned in a second direction which is perpendicular to the first direction. The orientation of the unactivated liquid crystal material between the first and second surfaces, varies between the first and second directions. The second liquid crystal cell has a first surface which is juxtapositioned against the second surface of the first liquid crystal cell. The unactivated liquid crystal material adjacent the first surface of the second cell is also aligned in the first direction. The unactivated liquid crystal material adjacent to the second surface of the second cell is aligned in the second direction. The second polarizer is polarized in the second direction and is juxtapositioned against the second surface of the second cell. The light control device may be placed in a light path in series with a mechanical shutter to form a composite shutter. The time duration that the composite shutter remains open is precisely controlled by the liquid crystal light control device of the invention.

In the "steady-state-off" mode of operation, the plane of polarization of the light passed by the first polarizer is rotated by the first and second liquid crystal cells and absorbed by the second polarizer. In the "dynamic-on" mode of operation, the first liquid crystal cell is activated and no longer rotates the plane of polarization of light passed by the first polarizer. However, the second liquid crystal cell rotates the plane of polarization of the light passed by the first polarizer and the first cell so that the light and image are passed by the second polarizer. In the "dynamic-off" mode of operation, both the first and second cells are energized so that the light passed by the first polarizer is no longer rotated by the cells. Consequently, the light passed by the first polarizer is absorbed by the second polarizer. Electronic circuitry is employed to precisely and rapidly open and close the liquid crystal device, either in a manual, fixed or automatic mode. If a mechanical shutter is utilized, it is opened before the "dynamic-on" mode and closed after the "dynamic-off" mode of operation to enable the first and second cells to return to their steady state condition. The mechanical shutter also prevents light leakage through the liquid crystal shutter from deleteriously affecting the film during the "steady-state-off" mode of operation.

BRIEF DESCRIPTION OF THE DRAWINGS

FIG. 1 is a cross sectional view of one of the liquid crystal cells employed in the light control device of one embodiment of the invention;

FIG. 2 is an exploded view of the light control device;

FIG. 3 is an end view of the light control device of FIG. 2 in its assembled form;

FIG. 4 is a partial cross sectional side view of a simplified camera employing the light control device of FIG. 3 in combination with a mechanical shutter;

FIG. 5 is a diagrammatic view which illustrates the device of FIG. 3 in its "steady-state-off" mode of operation;

DETAILED DESCRIPTION OF THE PREFERRED EMBODIMENT

Figure 6:
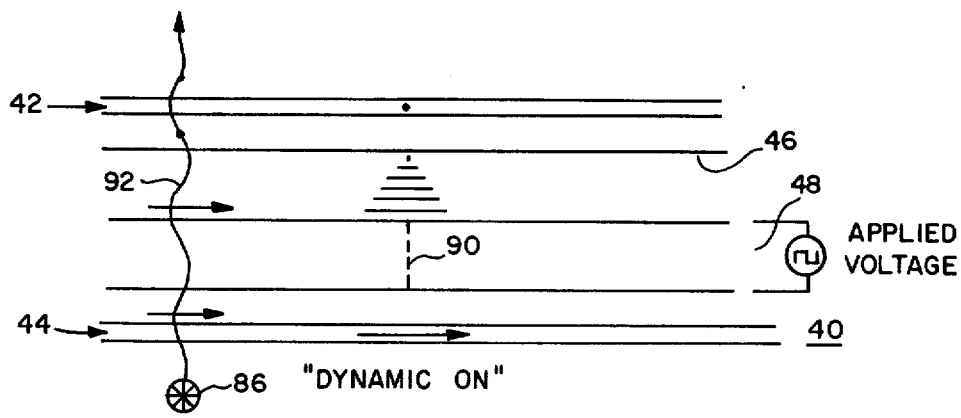
FIG. 6 is a diagrammatic view which illustrates the device of FIG. 3 in its "dynamic-on" mode of operation.

The light control device or electronic shutter of the preferred embodiment of the invention includes two adjacent liquid crystal cells which can have identical mechanical structures and two polarizers which "sandwich" the cells. Methods of fabricating cells which are similar to the cells utilized in the structure of the subject invention are described in the aforementioned related patent applications. A cell includes first and second rigid members, each of which have electrodes connected thereto. The members cooperate with each other to enclose a suitable twisted nematic liquid crystal composition and to hold the electrodes in a spaced relationship to each other and to the liquid crystal material.

More specifically, FIG. 1 shows a cross section of cell structure 10. Glass piece 12 which can have dimensions on the order of 1 inch by 1 inch by 30 mils forms the first rigid member on which transparent conductive electrode 13 is placed. Transparent electrode 13 may be a layer of indium oxide having a thickness of 1,000 Angstroms and which is deposited on surface 14 of glass 12 by sputtering, for instance. Silicon dioxide layer 15 is deposited on patterned electrode 13. Surface 16 of electrode 13 is exposed to provide external electrical connection to the cell through terminal 18. A layer of photopolymeric material 20, such as that identified by the trade name RISTON, is deposited on pattern silicon dioxide layer 13 and then patterned by a known process.

The second rigid member, which includes glass sheet 22, electrode 24 and patterned silicon dioxide 26, is placed on the upper surface of photopolymeric material 20 and bonded thereto. Next, an adhesive 28 is utilized to bond the structure together. Conductive adhesive 27 provides an electrically conductive path between electrode portion 30 and electrode 24. Terminal 33 is connected to electrode portion 30.

Next, cavity 32, which is surrounded by silicon dioxide 15, silicon dioxide 26 and photopolymeric layer 20, is filled with a liquid crystal material 34 and then the cavity is sealed. The chemical compound or liquid crystal material 34 located in cavity 30 is chosen from a group of substances which exhibit physical characteristics, some of which are typically associated with liquids and others which are typically associated with solid crystals. Liquid crystals resemble solid crystals in that the longitudinal axes of the rod-shaped molecules of the liquid crystalline substance are regularly oriented in a fashion similar to but less extensive than the molecular orientation of a crystalline solid. Liquid crystals are known to appear in many different forms, one of which is known as the "nematic" structure wherein the molecules are arranged with their major axes approximately parallel to each other. Molecules of nematic liquid crystal substances are not organized into definite layers as in some other liquid crystalline structures. There are many nematic liquid crystalline materials suitable for use in the cells of the device of the invention. Two examples are:

1. MBBA:PEBAB at 85:15 where MBBA is N-(p-Methoxybenzylidene)-p-butylaniline and PEBAB is p-ethoxybenzylidene-p-amino-benzonitrile; and
2. Commercially available Kodak mixture number 11900. The nematic liquid crystalline material used exhibits positive dielectric anisotropy and is chemically stable over the desired temperature range of operation.

The molecular structures of liquid crystalline matter are responsive to electric and magnetic fields. Referring to FIG. 1, if a positive potential is applied through terminal 33 and if a negative potential is applied through terminal 18, an electric field is created in the liquid crystalline material 34 in cavity 32 in the direction of arrow 36. If the magnitude of the field is large enough to activate the liquid crystal material, each rod-like molecule thereof except those immediately adjacent silicon dioxide layers 15 and 26, tends to orient itself with its major axis parallel to the field and perpendicular to the surface of the cell. This is characteristic of liquid crystal materials exhibiting positive dielectric anisotropy.

The inactivated orientation of the molecules of the nematic liquid crystal material can be controlled by rubbing the surface of one of the glass members with a buffing wheel or the like. As a result, the liquid crystal molecules line up in the same direction as a rubbing action and remain in this direction until a field of sufficient magnitude is applied. Light travels at a different velocity in the direction parallel to the axes of the molecules than it travels in the direction perpendicular to the axes of the liquid crystal molecules. Additional information about liquid crystal material can be obtained from the article "Liquid Crystal Displays" which was written by Richard W. Gurtler and Craig Maze and published in the *IEEE Spectrum*, Nov., 1972.

FIG. 2 shows an exploded, perspective view of one normally closed light control device or shutter 40 which is comprised of polarizers 42 and 44 and liquid crystal cells 46 and 48. Each of cells 46 and 48 is similar in construction to cell 10 of FIG. 1. Before assembling light control device 40, top surfaces 50 and 52 are rubbed in a first direction indicated by arrows 54 and the bottom surfaces 56 and 58 are rubbed in a second direction indicated by arrows 60, which is perpendicular to the direction of arrows 54. Consequently, the nematic liquid crystalline material on both cells is caused to assume the known "twisted" configuration. More particularly, in cell 46, for instance, the axes of the liquid crystal molecules in the plane parallel and immediately adjacent to surface 50 are aligned in the direction of arrow 54 and the molecules in the plane parallel and immediately adjacent to surface 56 are aligned in the direction of arrow 60. Molecules between these planes tend to be aligned along axes having a multiplicity of directions which more nearly approach the direction of arrow 54, the closer the plane of the molecule is located to surface 50 and more nearly approach the direction of arrow 60, the closer the plane of the molecule is located to surface 56. This results in a continuous rotation of the axes of the molecules located between surfaces 50 and 56. The molecules in cell 48 are similarly oriented. As shown in FIG. 2, cell 46 is inverted with respect to cell 48 so that the longer structural members of the cells are juxtapositioned next to each other. Polarizer 42 is juxtapositioned next to outwardly facing surface 50 of cell 46 and polarizer 44 is juxtapositioned next to outwardly facing surface 58 of cell 48. Polarizers 42 and 44 are polarized in directions that are perpendicular to each other.

FIG. 3 shows the relationship of the polarizers and cells of assembled shutter 40. A mechanical frame or optically clear adhesives are utilized to hold light control device 40 together. Terminals 68 and 70 are connected to cell 48 and terminals 72 and 74 are connected to cell 46. Assuming that the image enters through polarizer 44 and the film to be exposed is located near polarizer 42, then terminals 68 and 70 will receive an "image transmit" control signal and terminals 72 and 74 will receive an "image attenuate" control signal.

FIG. 4 is a partial cross sectional side view of a simplified camera 75, which is not drawn to scale. A portion of the barrel 76 of camera 75 has been broken away to reveal the internal structure thereof. Lens 77 is located near one end of barrel 76. Mechanical shutter 78, which may be any one of a variety of known inexpensive structures, can be located between lens 77 and liquid crystal shutter 40. Polarizer 44 faces lens 77 and polarizer 42 faces the film (not shown) within the camera. Lens 77, mechanical shutter 78 and electronically controllable liquid crystal shutter 40 are all located in series along the image path. The positions of liquid crystal shutter 40 and mechanical shutter 78 could be reversed.

In operation, mechanical shutter 78 is opened simultaneously with or slightly before liquid crystal shutter 40 is operated to its "dynamic-on" mode of operation. Mechanical shutter 78 is arranged to close a fixed predetermined period of time after it is opened. This predetermined period of time is selected to be greater than the maximum duration of the variable, "dynamic-on" mode of liquid crystal shutter 40. Thus, liquid crystal shutter 40 regulates the time period during which film included within camera 75 is exposed to the image. Normally closed mechanical shutter 78 protects the film against light leakage through liquid crystal shutter 40 when changing from the "dynamic-off" to the "steady-state-off" and during the "steady-state-off" mode of operation, as will be subsequently explained.

As indicated by arrow 79 of FIG. 5, the polarization of polarizer 44 corresponds to the unactivated alignment of the liquid crystal molecules of cell 48 near surface 58 as indicated by line 80. The polarization of polarizer 44 is perpendicular to the unactivated alignment of the liquid crystal molecules of cell 48 near surface 52. As indicated by dot 82, polarizer 42 is polarized in the same direction as the unactivated alignment of the liquid crystal molecules of cell 46 which are immediately adjacent to surface 50, as indicated by dot 84 and cross polarized with respect to the molecules near surface 56 of liquid crystal cell 46.

The "steady-state-off" mode of operation of device 40 is described with respect to FIG. 5. Symbol 86 indicates a plurality of rays of randomly polarized light travelling in the direction indicated by arrow 88. Polarizing film 44 transmits light having electric field vector components which are polarized in the direction of the polarization indicated by arrows 79. The liquid crystal material of cell 48 twists or rotates the plane of polarization of the light passing therethrough in correspondence with the rotation of the molecular axes of the molecules of liquid crystal as the light progresses through cell 48 toward cell 46. As a result, the light leaving cell 48 has a polarization which is rotated 90° with respect to the polarization of the light entering cell 48. Similarly, liquid crystal cell 46 also rotates the light passing from cell 48 as the light passes through cell 46. Consequently, the polarization of the light passed by polarizer 44 is rotated 180° before it reaches polarizer 42. Consequently, the light passing out of cell 46 has a polarization which is 90° away from the polarization of polarizer 42. Thus, the light is absorbed by polarizer 42. Accordingly, if light control device 40 is located in series with mechanical shutter 78, even though mechanical shutter 78 is opened, device 40 will continue to block the image from exposing the film while in its "steady-state-off" mode of operation.

FIG. 6 illustrates the "dynamic-on" mode of operation wherein an instantaneous electric field is developed across liquid crystal cell 48 in response to "an above threshold" potential difference of typically between 10 and 30 volts being developed across terminals 68 and 70. In response to the applied electric field, the longitudinal axes of substantially all the liquid crystal molecules of cell 48 exhibit homeotropic alignment (perpendicular to the surface) as indicated by lines 90. Hence, the polarization of the light, passed by polarizing film 44 remains substantially unchanged as the light passes through activated cell 48. Cell 46, which is not energized, rotates the plane of polarization of the polarized light transmitted by cell 48 so that the phase of the field vector of the light is shifted by 90° before being applied to polarizer 42. Thus, polarizing film 42 transmits the light and the image, as indicated by arrow 92 of FIG. 5. Assuming that the mechanical shutter has been previously opened, device 40 controls when the composite shutter opens to expose the film to the image.

The turn on time of light control device 40 is controlled by how rapidly the molecules of cell 48 align in response to the applied electric field of the "shutter-open" control signal. The speed of alignment depends on the thickness of the liquid crystal material, the magnitude of the voltage developed between terminals 68 and 70 and the species of the liquid crystal material. Alignment of the molecules of cell 48, in effect, can open the shutter in about 1 millisecond after the "shutter-open" control voltage is applied across terminals 68 and 70.

Figure 7:
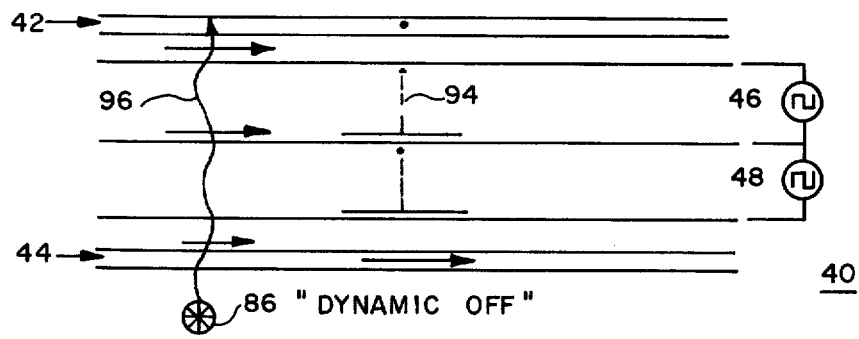
FIG. 7 is a diagrammatic view which illustrates the device of FIG. 3 in its "dynamic-off" mode of operation.

After the shutter has been opened for nearly the predetermined desired amount of time, a second or "shutter-close" control signal is applied between terminals 72 and 74 of cell 46 to begin the "dynamic-off" mode of operation. This causes the molecules of liquid crystal cell 46 to line up in the same direction as the molecules of cell 48 as indicated by lines 94 of FIG. 7. As a result, the plane of polarization of light passed by polarizer 44 is not rotated by cells 48 and 46. Thus, the light is absorbed by polarizer 42 as indicated by line 96.

Figure 8:
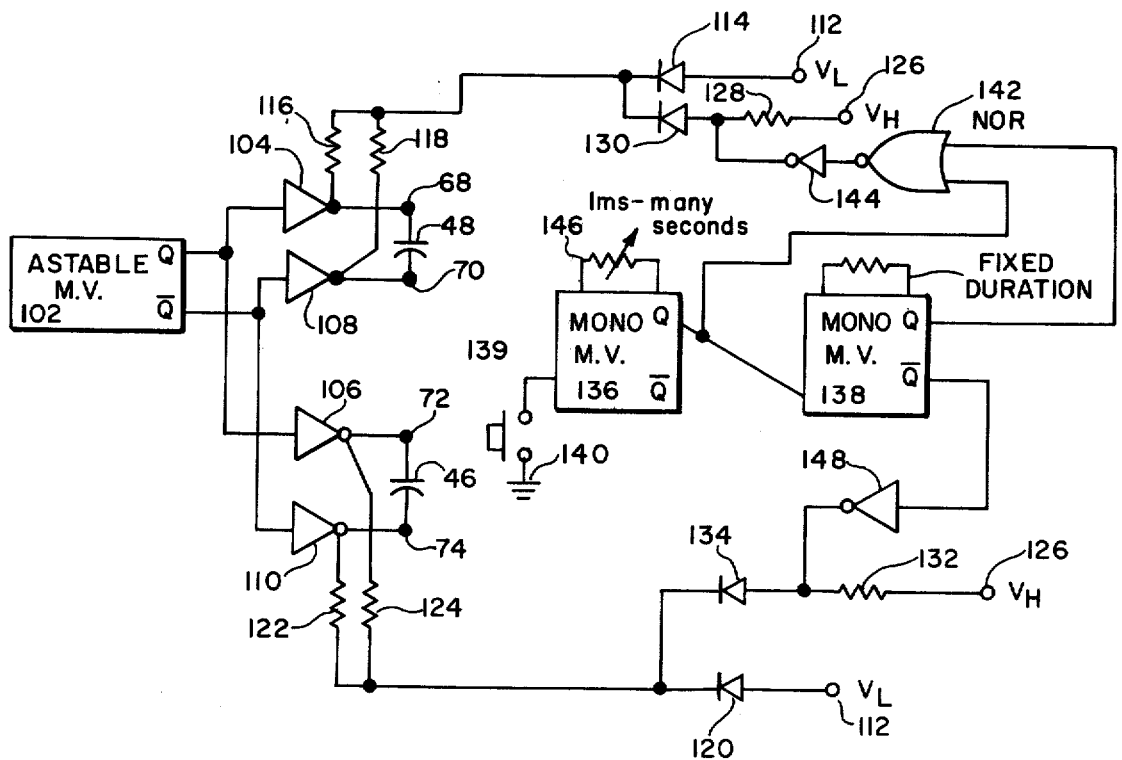
FIG. 8 is a diagram of a circuit suitable for operating the device of FIG. 3.

Thus, the closure time of shutter 40 after the occurrence of the "shutter-close" signal does not depend upon the "decay time" of liquid crystal molecules, as is the case with some prior art devices. As previously mentioned, that decay time is undesirably long, such as on the order of 60 milliseconds and not field controlled. The "closing" speed of the shutter of the invention is a function of "rise time" which is the time it takes for the liquid crystal domains to reach their field dependent positions after an electric field is applied having the magnitude above the threshold of the device. Since this "rise time" is a function of the magnitude of the voltage applied across terminals 72 and 74, it can be controlled. As a result, the time for the shutter to close can be precisely controlled by adjusting the magnitude of the voltage across terminals 72 and 74, which may typically be between 10 and 30 volts. Light control device 40 is capable of being rendered open within about one millisecond from the ocurrence of the shutter-open control signal and closed within about one millisecond from the occurrence of the shutter-close control signal. The duration of time the shutter remains open is controlled by the time between the shutter-open and the shutter-close control signals. Since light control device 42 is responsive to electrical signals, the duration of time during which light is transmitted can be precisely controlled by an inexpensive, compact electronic circuit which is provided in a monolithic integrated circuit, as shown in FIG. 8. Such circuits can be designed to facilitate automatic control or manual setting of the shutter-open duration or both.

After the light control or electronic shutter device 40 has been opened and closed, it is necessary to return the molecules of liquid crystalline cells 46 and 48 back to their steady-state condition. If light control device 40 is utilized in an application, such as a camera, it may be desirable to use a known mechanical shutter, such as shutter 78 of FIG. 4, which closes sometime during the dynamic-off condition. Consequently, when the voltages are removed from liquid crystal 46 and 48, the molecules thereof can reset or return to their steady-state conditions without creating undesired exposure of the film. Alternatively, there may be applications where a mechanical shutter in series with electronic shutter 40 is not required. Furthermore, since electronic shutter 40 includes only two polarizers 42 and 44, it transmits light and image therethrough with greater efficiency than similar light control devices including three polarizers. This increase in efficiency is important in some applications particularly where light is limited or it is desired to utilize a high speed film.

FIG. 8 discloses a partial block and partial schematic diagram of circuit 100 which generates the shutter-open and shutter-close control signals that are applied to cells 48 and 46 of shutter 40. Circuit 100 may be comprised of known complementary-metal-oxide-semiconductor devices and includes an astable multivibrator 102 of known configuration. The "Q" output terminal multivibrator 102 is connected to the input terminals of inverters 104 and 106 and the "$\overline{Q}$" output terminal is connected to the input terminals of inverters 108 and 110. The output terminals of inverters 104 and 108 are connected to terminals 68 and 70 of cell 48 and the output terminals of inverters 106 and 110 are connected to terminals 72 and 74 of cell 46.

Power terminal 112 is adapted to receive a low level d.c. (direct current) bias voltage, $V_L$, having a magnitude on the order of one volt and which is applied through diode 114. Resistor 116 connects the low level voltage to the output terminal of inverter 104 and resistor 118 connects the low level voltage to the output terminal of inverter 108. The low level or bias voltage is also connected through diode 120 and resistors 122 and 124 to the output terminals inverters 110 and 106. The magnitude of voltage $V_L$ is less than the threshold voltage necessary to cause homeotropic orientation of the molecules of cells 46 and 48. Inverters 104 and 108 are alternately switched on and off to apply a low level a.c. (alternating current) bias voltage for cell 48 and inverters 106 and 110 are alternately switched on and off to apply a low level a.c. voltage for cell 46. These bias voltages facilitate rapid turn on.

Power supply terminal 126 is adapted to receive a high level d.c. voltage, $V_H$, having a magnitude of between 10 and 30 volts. This driving voltage is selectively applied through resistor 128, diode 130, resistor 116 and resistor 118 to inverters 104 and 108. Moreover, the driving voltage is selectively applied through resistor 132, diode 134, resistor 122 and resistor 124 to inverters 106 and 110. This driving voltage has a magnitude of between 10 to 30 volts which is high enough to assure rapid homeotropic orientation of the molecules of cells 46 and 48.

The application of the biasing and driving voltages is controlled by multivibrators 136 and 138. The input terminal of multivibrator 136 is connected through shutter control switch 139 to the ground or reference terminal 140. The Q output terminal of multivibrator 136 is connected to the input terminal or multivibrator 138 and to one of the input terminals of NOR gate 142. The Q output terminal of monostable multivibrator 138 is connected to the other input terminal of NOR gate 142. The output terminal of NOR gate 142 is connected through inverter 144 to the junction between resistor 128 and diode 130. The magnitude of the resistance of resistance means 146, which is in the timing circuit for monostable multivibrator 136, controls the time duration that the light control device remains transmissive. Resistive means 146 could include a potentiometer or a light sensitive device to provide automatic control of the duration of the dynamic-on mode as a function of light intensity, etc. The $\overline{Q}$ output terminal of monostable multivibrator 138 is connected through inverter 148 to the junction between resistor 132 and diode 134.

Figure 9:
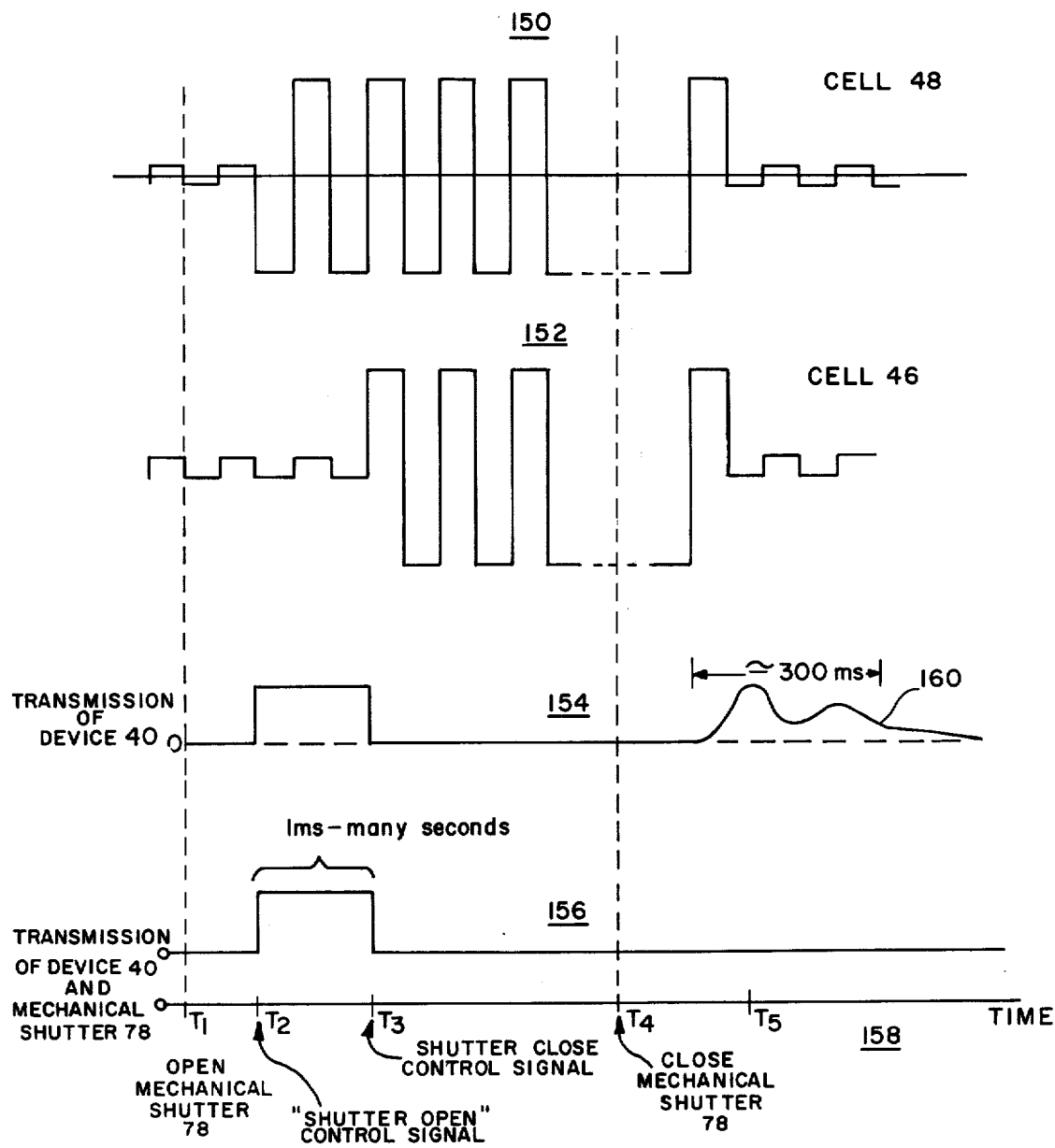
FIG. 9 shows waveforms useful in understanding the operation of the circuit illustrated in FIG. 8.

The waveforms of FIG. 9 illustrate the operation of circuit 100. Waveform 150 illustrates the rectangular a.c. voltage developed across cell 48 and waveform 152 illustrates the rectangular a.c. voltage developed across cell 46. Waveform 154 indicates a transmission characteristic of device 40 and waveform 156 indicates the transmission characteristic of composite shutter including device 40 and mechanical shutter 78. Axis 158 indicates time.

In operation, mechanical shutter 78 is opened at time $T_1$. Switch 139 closes at time $T_2$ because of a delay built into the mechanical mechanism interconnecting switch 139 and shutter 78. The ground applied through switch 139 to monostable multivibrator 136 causes the Q output of monostable multivibrator 136 to go to a high or logical 1 level of between 10 and 30 volts. As a result, the output or NOR gate 142 goes to a low or logical 0 level and the output of inverter 144 goes to a logical 1 level which results in an a.c. voltage of between 10 and 30 volts being applied across liquid crystal cell 48, as indicated by waveform 150. Hence, device 40 transmits an image in the manner described with respect to FIG. 6.

At time $T_3$, monostable multivibrator 136 changes state and causes its Q output to change from a logical 1 level to a logical 0 level which transition triggers monostable multivibrator 138. Consequently, the Q output of monostable multivibrator 138 goes to a high or logical 1 level which passes through NOR gate 142 and results in the high level voltage being maintained across cell 48. Moreover, the low level $\overline{Q}$ output signal of multivibrator 138 is inverted by inverter 148 which results in a logical 1 signal being applied to inverters 106 and 110 and a high level signal being developed across cell 46. Thus, at time $T_3$ both cell 46 and cell 48 are activated and the image is blocked, as previously described with respect to FIG. 7. At time $T_4$, which may be a fixed period away from time $T_1$, the mechanical shutter closes. At time $T_5$, monostable multivibrator 138 changes state to provide a low level or logical 0 Q output signal. Since the outputs at the Q output terminals of monostable multivibrators 136 and 138 are both low, the output of NOR gate 142 becomes high at time $T_5$. Consequently, the output of inverter 144 becomes low resulting in a low signal of relatively low amplitude being applied across cell 48. Moreover, at time $T_5$, the $\overline{Q}$ output signal multivibrator 138 goes high causing a logical 0 at the output terminal of inverter 148 and a signal of low magnitude across cell 46. After time $T_5$, the orientation of the liquid crystal molecules of cells 46 and 48 relax in response to the low level voltage developed thereacross. During this period of time after $T_5$, it would be possible for some light, as indicated by portion 160 of waveform 154, to pass through device 40 if the mechanical shutter was not closed.

What has been described, therefore, is a liquid crystal shutter or light control valve which is inexpensive, reliable and compact. Moreover, the liquid crystal shutter lends itself to precise control by a solid state electronic circuitry which can be provided in inexpensive form and readily maintained. The liquid crystal shutter can open within 1 millisecond of a shutter-open control signal and close within 1 millisecond of a shutter-close control signal. The liquid crystal shutter of the subject application is suitable for use in a camera when combined with an inexpensive mechanical shutter and has higher transmission efficiency than prior art liquid crystal shutters including three polarizers.

I claim:

1. A light control device including in combination:
first polarizer means polarized in a predetermined direction;
first twisted nematic liquid crystal cell with a first surface juxtapositioned along said first polarizer means and a second surface, said first liquid crystal cell having liquid crystal material with selectively oriented molecules interposed between said first and second surfaces thereof;
second twisted nematic liquid crystal cell with a first surface juxtapositioned along said second surface of said first liquid crystal cell and a second surface, said second liquid crystal cell having liquid crystal material with selectively oriented molecules interposed between said first and second surfaces thereof; and
second polarizer means juxtapositioned along said second surface of said second liquid crystal cell, said second polarizer means being polarized in another predetermined direction.

2. The light control device of claim 1 wherein:
said first polarizer means is polarized in a first direction; and
said liquid crystal material adjacent said first surface of said first liquid crystal cell being aligned in said first direction, said liquid crystal material adjacent said second surface of said first liquid crystal cell having an unactivated alignment in a second direction, said liquid crystal material between said first and second surfaces having unactivated orientations which vary between said first and second directions, said unactivated first liquid crystal cell thereby being adapted to transmit and rotate the plane of polarization of light transmitted by said first polarizer means.

3. The light control device of claim 2 wherein:
said liquid crystal material of said second liquid crystal cell is adjacent said first surface of said second liquid crystal cell being aligned in said first direction, said liquid crystal material of said second liquid crystal cell adjacent said second surface having an unactivated alignment in said second direction, said liquid crystal material between said first and second surfaces of said second liquid crystal cell having unactivated orientations which vary between said first direction and said second direction.

4. The light control device of claim 3 wherein said second direction is perpendicular to said first direction.

5. The light control device of claim 4 wherein said second polarizer means is polarized in said second direction.

6. A light control device including in combination:

normally closed mechanical shutter means located in an image path;

normally closed liquid crystal shutter means located in series with said mechanical shutter means in said image path, said liquid crystal shutter means having first polarizer means polarized in a first direction, first twisted nematic liquid crystal cell means having a first surface juxtapositioned along said first polarizer means and a second surface, second twisted nematic liquid crystal cell means having a first surface juxtapositioned along said second surface, first liquid crystal cell means and a second surface, and a second polarizer means polarized in a second direction and juxtapositioned along said second surface of said second liquid crystal cell means.

7. The light control device of claim 6 wherein said first and second polarizer means are cross polarized with respect to each other.

8. The light control device of claim 6 wherein:
said liquid crystal material adjacent said first surface being aligned in said first predetermined direction, said liquid crystal material adjacent said second surface being aligned in said second predetermined direction, said liquid crystal material between said first and second surfaces having unactivated orientations which vary between said first and said second directions.

9. The light control device of claim 8 wherein said liquid crystal material of said first and second liquid crystal cells exhibit homeotropic alignment when activated in response to electrical signals.

10. The light control device of claim 6 further including:
electrical circuit means having a first set of electrodes connected to said first liquid crystal cell means and a second set of electrodes connected to said second liquid crystal cell means;
said electrical circuit means having a first circuit providing a first control voltage which activates said first liquid crystal cell to render the light control device transmissive; and
said circuit means having a second circuit providing second control voltages which activates both said first liquid crystal cell and second liquid crystal cell to render the light control device non-transmissive.

11. A light control device including in combination:
first polarizer means polarized in a predetermined direction;
second polarizer means polarized in a second predetermined direction; and
first and second liquid crystal cells positioned between said first and second polarizer means, one of said liquid crystals serving to rotate light passing through said first polarizer means to the predetermined direction of said second polarizer means when one of said liquid crystals is in an unactivated state and the other is in an activated state, thereby to pass light through said device, and said second polarizer means blocking passage of light passing through said first polarizer means and first and second liquid crystal cells when both liquid crystal cells are in an activated or unactivated state.

12. A camera including, in combination:
lens means located in an image suitable for transmitting an image to a light sensitive image recieiving medium; and
a shutter comprising the light control device of claim 11 located in the image path.

13. The camera of claim 12 additionally comprising:
a mechanical shutter located in the image path.

14. A camera including, in combination:
lens means located in an image path suitable for transmitting an image to a light sensitive image receiving medium; and
a shutter comprising the light control device of claim 7 located in the image path.

* * * * *